March 25, 1924.

J. R. WHITE ET AL 1,487,906

BAKE PAN

Filed July 27, 1922

Inventors
J. R. White
&
J. G. Els

By Lacey & Lacey, Attorneys

March 25, 1924.
J. R. WHITE ET AL
BAKE PAN
Filed July 27, 1922
1,487,906
2 Sheets-Sheet 2
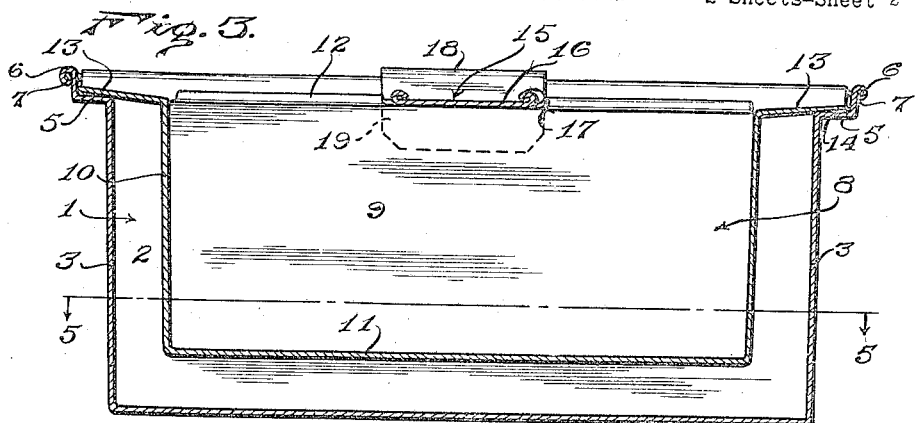
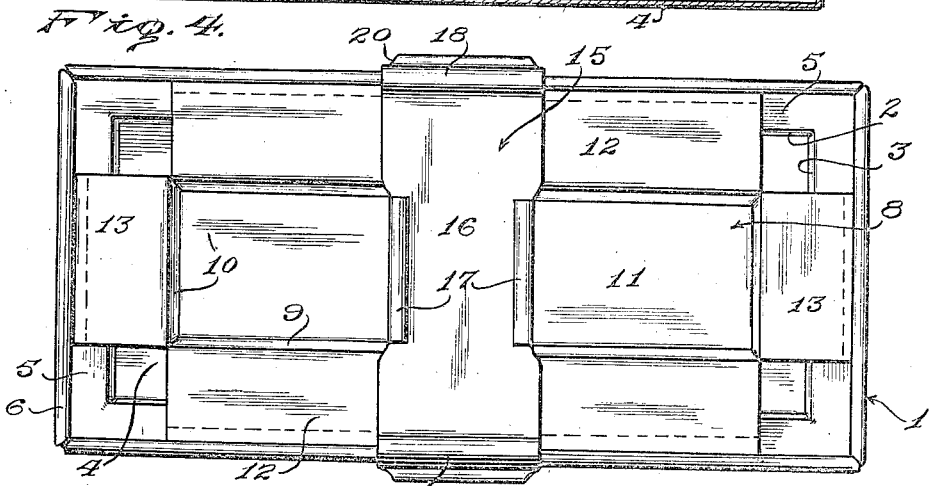
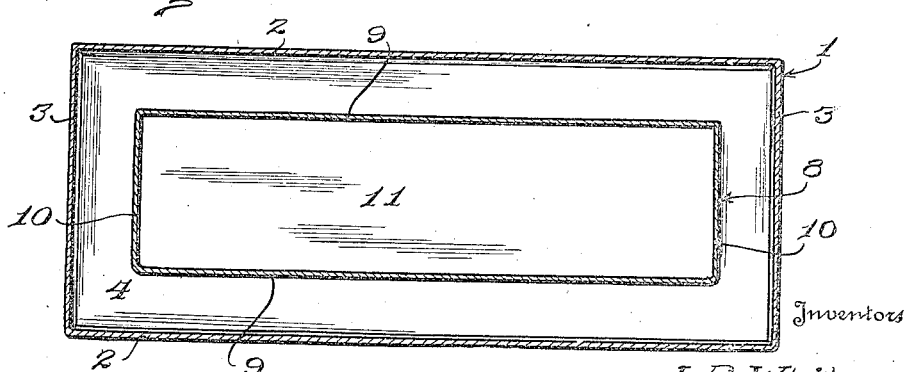
Inventors
J. R. White
&
J. G. Els
By *Larry Karry*, Attorneys Patented Mar. 25, 1924.

1,487,906

UNITED STATES PATENT OFFICE.

JOHN R. WHITE AND JAMES G. ELS, OF DALLAS, TEXAS.

BAKE PAN.

Application filed July 27, 1922. Serial No. 577,905.

*To all whom it may concern:*

Be it known that JOHN R. WHITE and JAMES G. ELS, citizens of the United States, residing at Dallas, in the county of Dallas and State of Texas, have invented certain new and useful Improvements in Bake Pans, of which the following is a specification.

This invention relates to improvements in baking pans and more particularly to a pan for baking cake in a predetermined form or shape, the principal object of the invention being to provide a pan for use in baking a cake such as disclosed in our co-pending application, filed July 27, 1922, Serial No. 577,906. The cake disclosed in said co-pending application has a general oblong rectangular form and is hollow and open at its top so that a brick of ice cream, or ice cream in bulk, may be disposed or packed into the cake and the two delicacies served in this form, and the present invention therefore has as its primary object to provide a bake pan by the use of which a cake of the form stated may be baked.

Another important object of the invention is to provide a bake pan embodying a core adapted to be disposed therein so as to suitably mold the batter, and to so construct this core that the same may be readily assembled with the pan and readily separated therefrom.

Another object of the invention is to so construct the core that it will be accurately centered within the pan and maintained in proper position during the entire baking operation so that the cakes baked in the pan will be of uniform size and contour.

In the accompanying drawings:

Fig. 3 is a vertical longitudinal sectional view through the pan;

Fig. 4 is a top plan view of the pan;

Fig. 5 is a horizontal sectional view substantially on the line 5—5 of Fig. 3.

Figures 1, 2:
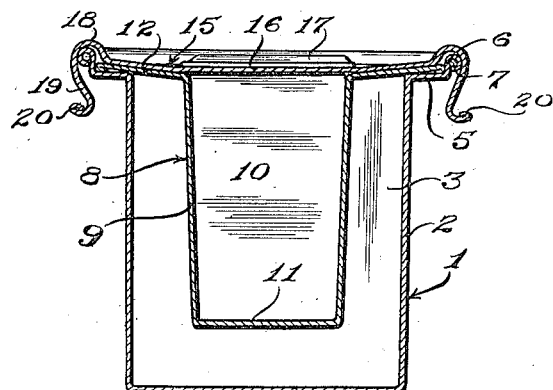
Figure 1 is a perspective view of the bake pan embodying the invention, the core being shown removed from the pan.
Fig. 2 is a vertical transverse sectional view through the pan.

The body of the pan, or in other words the pan proper, is indicated in general by the numeral 1 and the same is preferably formed from sheet metal and comprises side walls 2, end walls 3, and a bottom 4. At the top of its side and end walls, the pan body is provided with an outstanding flange 5 and at the outer edge of this flange with an upstanding flange which is indicated by the numeral 6 and is preferably overturned or beaded, as at 7. The flanges 5 and 6 preferably occupy planes substantially at right angles to each other and the flange 5 occupies a plane substantially at right angles to the walls of the pan.

The core heretofore referred to is indicated in general by the numeral 8 and the said core is likewise formed of sheet metal and is preferably of hollow oblong rectangular form although it will be understood that both it and the pan body may be of some other geometrical form or design if this should be found desirable. The core comprises side walls 9, end walls 10, and a bottom 11 and the length, width and depth dimensions of the core are somewhat less than the corresponding interior dimensions of the pan body 1 so that when the core is disposed within the pan and supported in a manner to be presently explained, its side and end walls, and its bottom will be respectively spaced from the side and end walls and bottom of the pan, thus providing a space within the article the boundaries of which are of such form as to suitably mold the batter deposited within the pan. The core 8 is provided at the upper edges of its side walls 9 with substantially horizontally outstanding flanges 12, and similar flanges 13 are provided at the upper edges of the end walls 10, and when the core is disposed within the pan 1, the flanges 12 and 13 will rest upon the flange 5 of the said pan and support will thus be provided for the core. Preferably the outer margins of the flanges 12 and 13 are overturned upon themselves, as at 14, and these edges are designed to engage against the inner side of the upstanding flange 6, as best shown in Figs. 2 and 3 of the drawings, so that the core will be maintained properly centered with relation to the pan 1. At this point it will be evident that the core when assembled with the pan will be spaced from the same in such a manner as to mold the batter into the form of an oblong rectangular cake which is hollow and is open at its top, the sides, ends and bottom of the cake being of uniform thickness.

In order that the core may be retained within the pan and prevented from floating upon the batter within the pan before the same has become baked and also in order that the core may be conveniently handled, means are provided which will now be described. The numeral 15 indicates a strip of sheet metal which is disposed transversely of the open top of the core 8 and extends over and is secured to the intermediate portions of the flanges 12, the portion of the strip which spans the open top of the said core constituting a handle indicated by the numeral 16 and having its edges overturned upon themselves, as at 17, so as to avoid the presence of sharp edges. The ends of the strip 15 project beyond the outer overturned edges of the flanges 12 of the core and are bent upwardly and outwardly as at 18 and thence downwardly and somewhat inwardly as at 19 to provide locking tongues adapted to engage over the beads 7 of the flanges 6 in the manner best shown in Fig. 2 and thus lock the core in place, the said strip 16 being resilient, and the ends of the tongues 18 being outwardly deflected as at 20 so as to provide convenient means whereby the tongues may be grasped and sprung out of engagement with the beads of the said flanges 6. The tongues fit over the flanges of the body of the pan in a snug manner as shown in Fig. 2 of the drawings and thus the core is held from floating upon the batter. The engagement of the tongues with the said flange 6 constitutes also a means for preventing lateral displacement of the core, such displacement and also longitudinal displacement being prevented by the engagement of the outer overturned edges of the flanges 12 and 13 against the upstanding flanges 6. It will also be apparent from the foregoing that when the core is fitted into place, the tongues 18 will engage over the overturned edges of the flanges 7 due to the resiliency of the said tongues and that the core, while normally securely retained in place, may be readily removed from the pan by merely springing the locking tongues in an outward direction and lifting the core by the handle portion 16 of the strip 15.

It will be understood that inasmuch as the core of the device is hollow, there will be a free circulation of heated air currents within this core thus insuring of a baking or crusting of the inner surfaces of the side and end walls and the upper surface of the bottom of the product to the same degree as the outer surfaces of these component parts.

Having thus described the invention, what is claimed as new is:

1. A bake pan for batter comprising a hollow body open at its top and provided at said top with an outstanding flange and an upstanding ledge along said flange, a hollow core removably disposed within the body and provided at the upper portion of its walls with outstanding flanges adapted to fit closely within said ledge and rest upon said body flange whereby to suspend the core within the body and center the same with relation thereto in order to form a chamber for the batter between the body and the core, and a member extending across the top of said core and being secured to the flanges thereof and having projecting terminal portions providing locking tongues engageable with said body flange and thereby holding the core firmly down in said hollow body.

2. A bake pan for cake batter comprising a hollow body and a hollow core each having solid side and end walls and a solid bottom, outwardly projecting flanges at the top edges of said side and end walls of the core, a seat having an upstanding ledge formed along the top edges of the side and end walls of said hollow body, whereby upon said core being inserted in said hollow body the core flanges will rest in said seat and firmly engage within said ledge in order to position said core in the body to provide spaces of uniform width between the bottoms, side and end walls of said core and said body; and a securing member for said core provided with depending tongues adapted to interlock with said ledge, said member being secured to said core flanges to hold the core firmly down in the body.

In testimony whereof we affix our signatures.

JOHN R. WHITE. [L. S.]
JAMES G. ELS. [L. S.]